July 29, 1930.   M. MARANGONI   1,771,934
DISHWASHING APPARATUS
Filed June 19, 1928   2 Sheets-Sheet 2
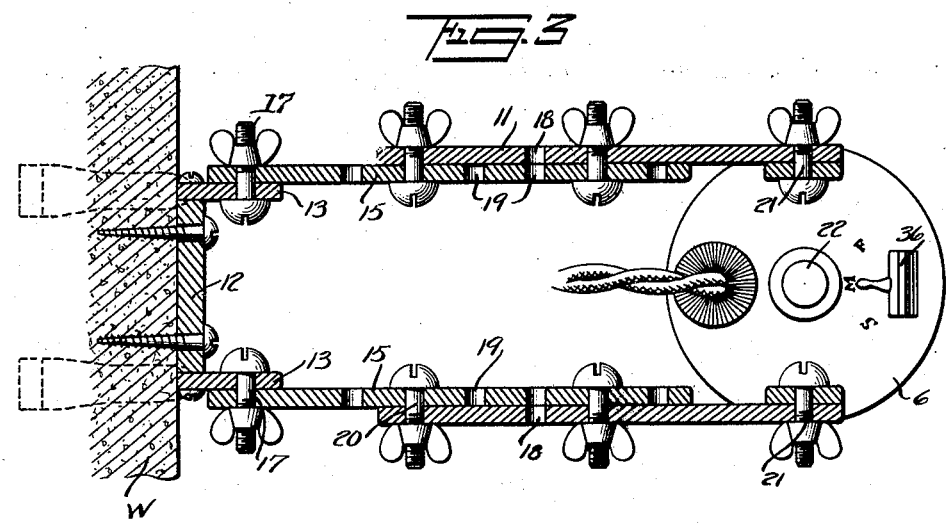
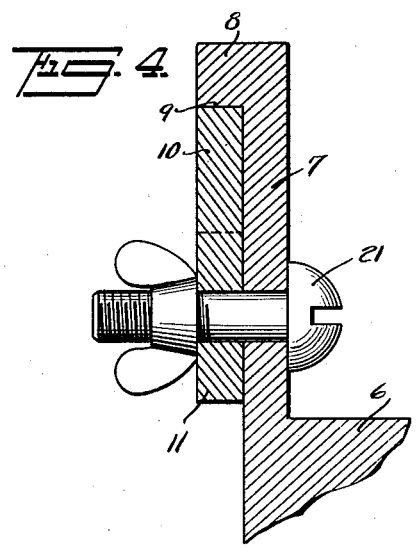
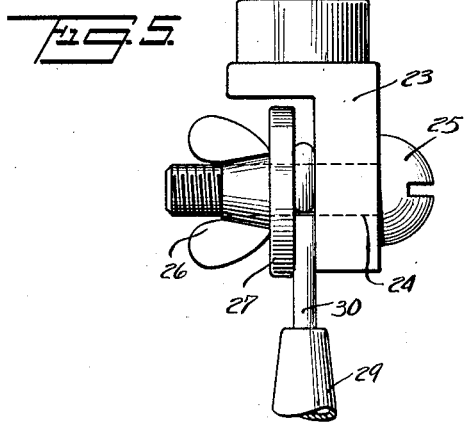
WITNESSES
INVENTOR
Mattia Marangoni
BY
ATTORNEY Patented July 29, 1930

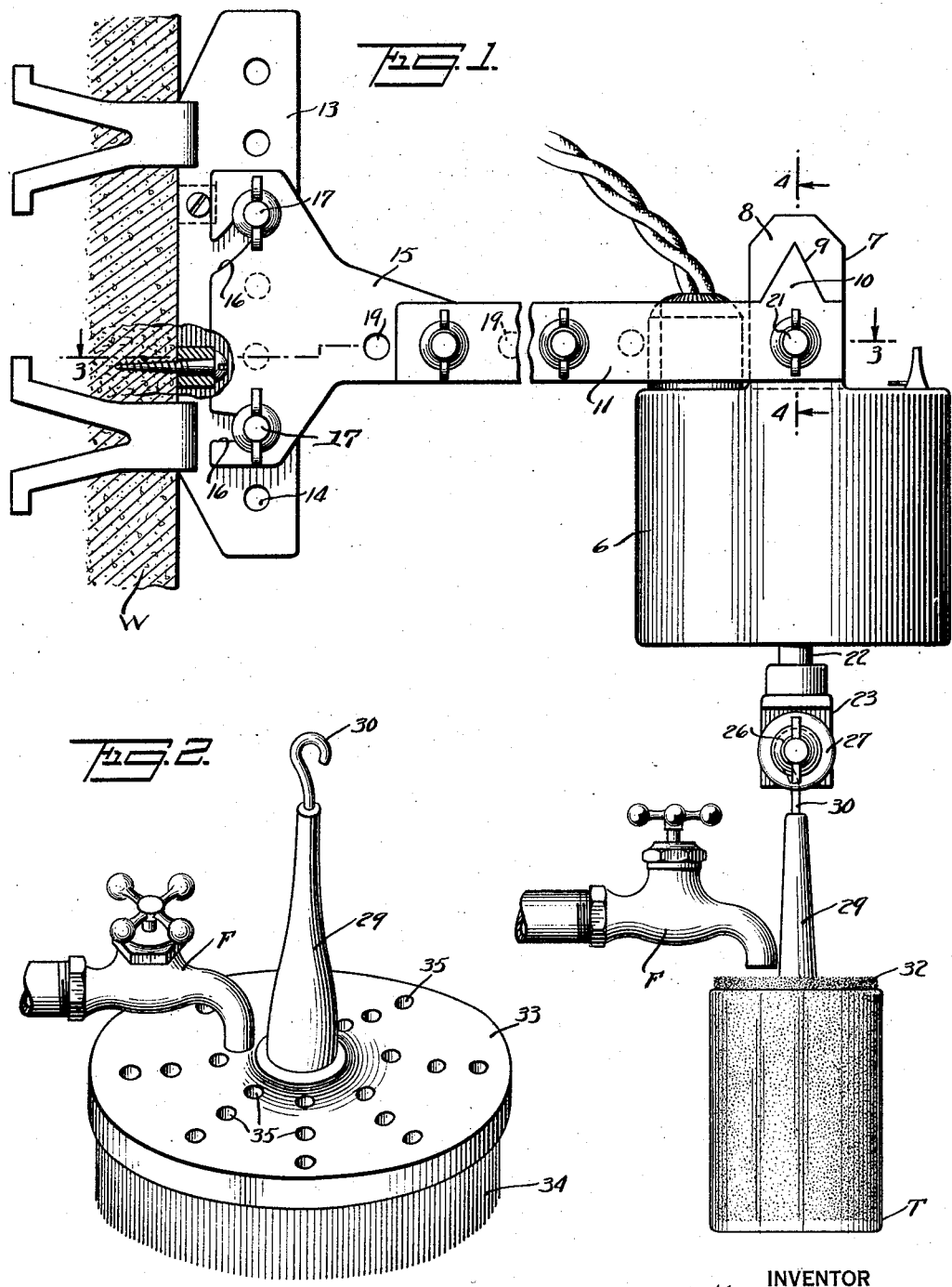

1,771,934

UNITED STATES PATENT OFFICE

MATTIA MARANGONI, OF NEW YORK, N. Y.

DISHWASHING APPARATUS

Application filed June 19, 1928. Serial No. 286,596.

This invention relates to an apparatus for washing dishes or tableware, and has particular reference to an electrically operated rotary brush, together with means for supporting the same over a sink, so that the brush is disposed directly under the faucet.

One of the principal objects of the present invention is to provide a dish washing apparatus by virtue of which plates, platters, cups, saucers, glasses or other tableware may be rapidly and effectually cleansed.

The invention further aims to provide in a dish washing apparatus an electric motor with means on the lower end of the motor shaft and on a plurality of brushes of different characters and configurations, for interchangeably connecting said brushes thereto for rotation with the motor shaft.

As a further object, the invention comprehends an adjustable bracket for supporting the motor over a sink whereby to dispose the various brushes under the sink faucet in the most advantageous position for use.

Other objects reside in the simplicity of construction and mode of use of the apparatus, the economy with which the same may be produced and installed and the general efficiency derived therefrom.

With the above recited and other objects in view, reference is had to the following description and accompanying drawings, in which there is exhibited one example or embodiment of the invention, while the claims define the actual scope of the same.

In the drawings:

Figure 1 is a side view of the device in use.

Figure 2 is a perspective view of a plate washing brush disposed in juxtaposition to the faucet.

Figure 3 is a sectional plan view taken approximately on the line 3—3 of Figure 1.

Figure 4 is a detail enlarged vertical sectional view taken approximately on the line 4—4 of Figure 1.

Figure 5 is an enlarged view of the connection between the brush and motor shaft.

Referring to the drawings by characters of reference, 6 designates an electric motor, the casing or housing of which is provided with upstanding ears 7 having laterally projecting lugs 8 formed with V-shaped notches 9 on the under side which are designed to receive the upwardly projecting V-shaped tongues 10 on the free extremities of arms 11. The arms 11 constitute a part of a supporting bracket which includes a base 12 suitably anchored to a wall above a sink. The base 12 is formed with parallel vertically disposed side rails 13 which are provided with vertical rows of apertures 14. Bracket arms 15 having vertically spaced slots 16 are provided and said slots are designed to be selectively registered with certain of the apertures 14 for the reception of retaining bolts 17 whereby the arms 15 are vertically adjustable with respect to the bracket base. The bracket arms 11 and 15 are provided with horizontal rows of apertures 18 and 19 to be selectively registered for the reception of retaining bolts 20 whereby horizontal adjustment of the bracket may be obtained to dispose the motor at different distances from the wall W. Retaining bolts 21 are designed to pass through the ears 7 and the terminals of the arms 11. The motor shaft 22 has its lower end provided with a substantially inverted L-shaped head 23, the depending portion of which is provided with a horizontal aperture 24 receiving a bolt 25 having a winged nut 26 and a washer 27.

The brushes are provided with shanks 29 having hooked terminals 30 which are designed to be engaged over the shanks of the bolt 25 and clamped between the head 23 and the washer 27 so that the brush is fixed to the motor shaft for rotation therewith. As illustrated in Figure 1, the brush shank 29 is formed with radial bristles 32 so that the same may be employed for washing a tumbler T or a cup or other similar receptacles of this nature. As illustrated in Figure 2, the brush shank 29 is formed with a disk like head 33 at its lower end which is preferably formed with a concaved upper surface and with depending bristles 34. The disk like head is provided with vertical apertures 35 to permit water from the faucet F to feed therethrough onto the bristles for washing and rinsing a plate, saucer or other similar article which is held under the brush. By rendering the motor supporting bracket adjustable, both vertically and horizontally, it is obvious that in using the brushes of different configurations and characters the same may be effectually brought into juxtaposition to the faucet. If desired, the motor 6 may be provided with a suitable switch 36, by virtue of which the speed of rotation of the motor may be controlled in accordance with the desires of the user.

What is claimed is:

1. In a dish washing apparatus, a motor, means on the motor shaft for connecting a brush thereto for rotation therewith and an adjustable bracket for supporting said motor over a sink whereby to dispose the brush directly under the sink faucet, said bracket including a stationary base and vertically and horizontally adjustable arms projecting outwardly therefrom.

2. In a dish washing apparatus, a motor, means on the motor shaft for connecting a brush thereto for rotation therewith, said brush having a perforated top adapted to allow passage of water therethrough, an adjustable bracket for supporting said motor over a sink whereby to dispose the brush directly under the sink faucet, said bracket including a stationary base and vertically and horizontally adjustable arms projecting outwardly therefrom and means for retaining the arms in adjusted relation to each other and to the base.

Signed at New York, in the county of New York and State of New York, this 18th day of June A. D. 1928.

MATTIA MARANGONI.